United States Patent Office 2,909,542
Patented Oct. 20, 1959

2,909,542

USE OF AMIDOXIMES IN SOLVENT EXTRACTION OF METAL IONS FROM SOLUTION

Saul Soloway, New Rochelle, N.Y.

No Drawing. Application February 7, 1955
Serial No. 486,720

16 Claims. (Cl. 260—429.1)

This invention relates to the use of amidoximes dissolved in organic solvents for the purpose of extracting metal ions from solution. It is well known that certain solvents per se may be employed to extract such valuable salts as uranium nitrate, thorium chloride, and potassium chloraurate from aqueous solutions. However, rarely do their solubilities in organic media approach the corresponding values in water. Hence, unfavorable distribution coefficients require the handling of relatively large volumes of extracting liquid per unit volume of aqueous solution. For very dilute solutions (0.01% or less) the loss of solvent due to aqueous solubility, volatilization, etc. plus the cost of solvent recovery for reuse makes this type of process generally uneconomical.

In order to increase the efficiency of extraction of metal ions, certain organic reagents which form compounds therewith may be dissolved in the immiscible organic solvent. Of these reagents the ones containing chelating groups have been shown to be particularly valuable. In this connection I have found the amidoximes to be highly effective and of great commercial value. These compounds not only increase the extraction efficiency of the common solvents such as alcohols, ethers, ketones, esters, etc., but also permit the use of paraffin, cycloparaffin, and aromatic hydrocarbons as solvents. Although the latter types of extractants would be considered ideal in these processes because of their cheapness, ease of recovery, and low water solubility, the solubility of metal salts therein is so low as to render them useless for this purpose. However, the amidoximes containing six carbon atoms or more, as well as their metal complexes, are sufficiently soluble in saturated, unsaturated, and halogenated hydrocarbons as to permit the use of such solutions as metal ion extractants to great economic advantage. For example, I have found that metal ions such as: $AuCl_4^{1-}$, $Co^{2+}$, $Cu^{2+}$, $Ni^{2+}$, $PdCl_4^{2-}$, $PtCl_6^{4-}$, $RuCl_6^{2-}$, $UO_2^{2+}$ are quantitatively (in the practical sense 95% or better) extracted by ligroin, cyclohexane or benzene solutions of amidoximes derived from caproic, caprylic, capric, lauric, stearic, cyclohexylcarboxylic, cyclohexylacetic, ω-cyclohexylbutyric, ω-cyclohexylcaproic, phenylacetic, ω-phenylpropionic, and ω-phenylbutyric acids. It is unnecessary to use a single compound in these processes. I have found that amidoxime mixtures derived from natural fatty acid sources such as coconut, soy, tallow, and tall oil were as good or better than the pure derivative containing about the same average number of carbon atoms. Most of these amidoximes mixtures contain mainly those even-numbered homologues derived from $C_{10}$ to $C_{18}$ saturated straight chain fatty acids. However, in some cases such as the soy mixture, there may be as much as 70% unsaturated components. These unsaturated amidoximes are derived from oleic, linoleic, and linolenic acids for the most part. As might be expected the unsaturated components have the advantage of increasing the solubility of the mixture in the organic extracting medium.

Some of the solvents employed to demonstrate the efficiency capramidoxime

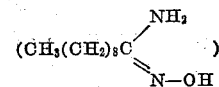

and mixed soy amidoximes as 1% solutions in effecting the extraction of $Cu^{2+}$, $Co^{2+}$, $Ni^{2+}$, $UO_2^{2+}$ $PdCl_4^{2-}$, $AuCl_4^{1-}$, and $PtCl_6^{2-}$ at pH 3 were: diethyl ether, diamyl ether, anisole, tributyl phosphate, isobutyl isobutyrate, methyl laurate, diisobutyl ketone, iso phorone, n-octanol, lauryl alcohol, butyl Cellosolve, and butyl Carbitol.

That is, the extraction of those metal ions at pH 3 was quantitative in those solvents containing capramidoxime or mixed soy amidoximes. Solvent mixtures such as fusel oil, mixed alcohols derived from the alkaline hydrolysis of chlorinated kerosene, cotton seed oil, corn oil, methyl and ethyl esters of coconut fatty acids, also proved to be highly effacacious. However, much of my effort has been directed toward the employment of hydrocarbon solvents and their chlorinated derivatives for the reasons mentioned. Although such solvents as ligroin (B.P. 60°–90° C.), ligroin (90°–120° C.), kerosene, n-octane, cyclohexane, methyl cyclohexane, benzene, toluene, chlorinated kerosene, chlorinated pentanes, and chlorobenzene could dissolve enough of an amidoxime (the longer the chain length the seemingly better solubility) to cause the extraction of $Cu^{2+}$, $Co^{2+}$, $Ni^{2}_{+}$, $AuCl_4^{1-}$, $PtCl_6^{2-}$, $UO_2^{2+}$, it was found that the process could be greatly improved by the addition of components which would:

(1) Increase the amidoxime solubility
(2) Prevent the formation of tight emulsions which sometimes occurred on shaking or stirring the aqueous and hydrocarbon phases
(3) Decrease the acidity in organic phase so as to promote chelate formation The use of alcohols containing from 5 to 18 carbon atoms to the extent of 5 to 30% served admirably in preventing tight emulsions. Examples of the alcohols used were isoamyl, n-octanol, 3,3,5-trimethylcyclohexanol-1, 7-ethyl-2-methyl undecanol-4, stearyl alcohol, oleyl alcohol, and 2,6,8-trimethylnonanol-4. Amines such as tri-n-butyl amine, tri-n-amyl amine, di-2-ethylhexylamine, and dibenzylamine greatly increased the pH range over which a given metal ion could be extracted from an aqueous solution. For example, the quantitative extraction of uranyl ion from 3% aqueous sodium chloride can be accomplished at pH 0 by solution 2 (composition is given later in the specification) if di-2-ethylhexylamine or tri-n-amylamine is added. Without the added amine the limit of quantitative extraction of $UO_2^{2+}$ is around pH 3. These high carbon content amines have low water and aqueous acid solubilities. Hence, there is little loss in their use, particularly when incorporated in hydrocarbon solvents where most of them are soluble in all proportions. Both the alcohols and amines serve to increase the solubility of the amidoximes in hydrocarbons. As a matter of fact, it was found that solutions containing these additives were best prepared by dissolving the desired amount of a given amidoxime in the additive followed by dilution with the hydrocarbon. In general, it was found that the common solvents containing oxygen in their functional groups served to improve the extracting hydrocarbon solutions of amidoximes in much the same manner as alcohols.

The efficiency of extraction of a given metal ion such as $Cu^{2+}$, $Ni^{2+}$, $UO_2^{2+}$, etc. varied mainly with the amidoxime, the extracting medium, and the pH of the aqueous solution. The presence of alkali and alkaline earth salts in the aqueous solutions to be extracted proved beneficial because these salts served as aids in emulsion prevention. However, this observation should not be interpreted as meaning that alkali and alkaline earth cations are not extracted to any extent. The variability in the extraction coefficients of metal ions is extremely great, and therefore permits the extraction of some ions in the presence of others. However, because in a competitive situation a given ion is extracted to the practical exclusion of others, this does not preclude the possibility of the extraction of these ions with low coefficients in the absence of those with high coefficients. Table I gives a portion of the accumulated data showing the variation of extraction efficiency with the amidoxime and the solvent. The extracting solutions used were the following:

15 ml. tetradecanol
35 ml. cyclohexane

Solution 7:
1 gr. capramidoxime
100 gr. diamyl ether

Solution 8:
1 gr. mixed soy amidoximes (Armour & Co.'s, "Arneel SD")
100 gr. diisobutyl ketone Solution 9:
1 gr. mixed soy amidoximes
20 gr. di-2-ethylhexylamine
80 gr. diamyl ether Solution 10:
1 gr. mixed soy amidoximes
100 gr. di-3-ethylhexylamine

TABLE I

*Extraction efficiency of various amidoxime solutions as a function of pH*

| Extracting solution | $Fe^{3+}$ | $Co^{2+}$ | $Ni^{2+}$ | $Ru^{4+}$ $(RuCl_6)^{2-}$ | $Rh^{3+}$ $(RhCl_4)^{1-}$ | $Pd^{2+}$ $(PdCl_4)^{2-}$ | $Pt^{4+}$ $(PtCl_6)^{2-}$ | $Au^{3+}$ $(AuCl_4)^{1-}$ | $U^{6+}$ $(UO_2)^{2+}$ | $Cu^{2+}$ | $Mn^{2+}$ |
|---|---|---|---|---|---|---|---|---|---|---|---|
| 1 | 1 | 2 | 3 | 2 | 1 | 0 | 12 M HCL | 12 M HCL | 3 | 3 | |
| 2 | 1 | | | 2 | 1 | | 12 M HCL | 12 M HCL | 3 | 3 | |
| 3 | 2 | 2 | 2 | | | | 12 M HCL | 12 M HCL | 2 | 2 | 3 |
| 4 | 1 | 1 | 2 | 2 | 1 | 1 | 12 M HCL | 12 M HCL | 2 | 2 | 4 |
| 5 | (¹) | (¹) | (¹) | (¹) | (¹) | (¹) | (¹) | (¹) | (¹) | (¹) | (¹) |
| 6 | 2 | 3 | 3 | | | | 12 M HCL | 12 M HCL | 3 | 3 | |
| 7 | 1 | 2 | 2 | | | | 12 M HCL | 12 M HCL | 2 | 2 | |
| 8 | 1 | 2 | 3 | | | | 12 M HCL | 12 M HCL | 3 | 2 | |
| 9 | 0 | 0 | 0 | | | 0 | 12 M HCL | 12 M HCL | 0 | 0 | |
| 10 | 0 | 0 | 0 | | | 0 | | | 0 | 0 | |

¹ Less than 5% extraction between pH 3 to 6 in all instances.
NOTE.—The numbers in the table are the pH's at or above which the extraction of the given metal ion is quantitative ($\geq 95\%$). The upper pH limit for quantitative extraction is that value at which the hydroxide, oxide, or carbonate begins to precipitate instead. In the cases of $AuCl_4^{1-}$ and $PtCl_6^{2-}$, these ions were quantitatively extracted from solutions as acid as 12 molar hydrochloric acid to a mild alkalinity. Blank spaces indicate instances for which the experiments were not run.

Solution 1:
1 gr. stearamidoxime
20 gr. 3,3,5 trimethylcyclohexanol-1
100 ml. cyclohexane Solution 2:
15 gr. cocoamidoximes (derived from the mixed nitriles of the fatty acids of coconut. The nitrile mixture was Armour & Co.'s "Arneel CD.")
100 ml. diisobutyl carbinol
900 ml. cyclohexane Solution 3:
2 gr. capramidoxime

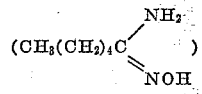

25 ml. "tetradecanol" (7-ethyl-2-methylundecanol-4)
75 ml. cyclohexane

Solution 4:
2 gr. capramidoxime

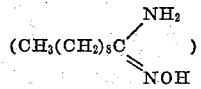

25 ml. "tetradecanol"
75 ml. cyclohexane

Solution 5:
1 gr. p-methylbenzamidoxime
15 ml. tetradecanol
35 ml. cyclohexane

Solution 6:
1 gr. phenylacetamidoxime

In the case of each metal ion under test, dilute aqueous solutions were prepared for extraction in the following manner: 2 drops of a concentrated (1 mg./ml.) aqueous solution of one of its common salts were added, to 5 ml. aliquots of 3% sodium chloride, whose pH's had been adjusted to integral values between 0 and 6 with hydrochloric acid. To each test tube 1 ml. of extracting solution was added, and the mixture shaken for 5 to 10 seconds. The color in the extract was then compared with a standard as a measure of the efficiency of extraction. Colored metal ions were chosen for test because these ions formed intensely colored amidoximes, whose concentrations could be readily measured colorimetrically. The numbers given in Table I are the pH values above which metal ion extraction is quantitative (95% or better) with a one ml. aliquot of extractant. Some experiments were run above pH 7. On the alkaline side the extraction was also quantitative up to those pH's at which the hydroxide, oxide, or carbonate precipitated. In most cases the metal ions could be reextracted from the organic layer by shaking with 1 to 30% HCl, depending on the ion. Notable exceptions were $(AuCl_4)^{1-}$ and $(PtCl_6)^{2-}$ which are extracted by amidoxime solutions from aqueous acid solutions which were as high as 20 molar with respect to sulfuric acid. In such instances the noble metals were precipitated from their amidoxime solutions by treating the extract with a reducing agent such as magnesium, zinc, or alkaline formaldehyde. It was also possible to retransfer some of the metal ions back to an aqueous medium by the use of water soluble chelating or complexing agents. Citrate buffers, alkali cyanide, and α-amino acid buffers were useful.

After elution of a given metal ion, the amidoxime solution could be reemployed for the extraction of the same or a different ion. The cycle was run on several of the extracting solutions listed in Table I with different combinations of ions. At each step the metal ion was eluted with dilute hydrochloric acid. The organic extractant was then washed with 1% sodium chloride, 3% sodium carbonate, and 1% sodium chloride in that order.

There is considerable variation in extraction efficiency with the chain length of an amidoxime. For example, formamidoxime and acetamidoxime, although strong chelaters for some metal ions in water, were found to have relatively poor solubilities in the organic solvents found useful herein, and hence were not of any particular value in extraction processes. Table I shows many differences among the aliphatic fatty acid amidoximes. The situation is complicated by the differences in solubilities of the various metal amidoximes particularly as a function of pH.

The striking difference in performance between p-methylbenzamidoxime and its isomer, phenylacetamidoxime, is also shown in Table I. It was also found that p-methylbenzamidoxime dissolved in ethyl ether, or isoamyl alcohol, or diisobutyl ketone did not pick up appreciable amounts of $UO_2^{2+}$, $Fe^{3+}$, $Co^{2+}$, $Ni^{2+}$, $(PdCl_4)^{2-}$ at pH 3. Phenylacetamidoxime, on the other hand, in those same solvents does cause $Fe^{3+}$, $Co^{2+}$, and $Ni^{2+}$ to be quantitatively extracted. These observations are attributed to the greater basicity of the phenylacetamidoxime in which the acidifying ring influence is insulated from the amidoxime function by the methylene group. The behavior of benzamidoxime was almost identical with its p-methyl homolog, whereas ω-phenyl butyramidoxime was like phenylacetamidoxime. In the same connection it is interesting to note that cyclohexylbenzamidoxime in isoamyl alcohol solution picked up $UO_2^{2+}$, $Fe^{3+}$, $Ni^{2+}$, and $Co^{2+}$, also contrary to the behavior of its unsaturated relative, benzamidoxime. Although no quantitative measurements of the $pK_b$ values of various benzamidoximes were made, indicators have shown the aliphatic and alicyclic benzamidoximes to be stronger bases than those in which the benzene ring is directly attached to the chelating group.

I have also observed that the solvent medium plays a major role in extraction efficiency. For example, caproamidoxime in 10% tetradecanol–90% cyclohexane is a poorer extracting medium for $UO_2^{2+}$ than the same compound in tetradecanol alone, diisobutyl carbinol, or diisobutyl ketone. On the other hand stearamidoxime or the mixed amidoximes from the fatty acids of coconut, soy or tallow in 10% tetradecanol–90% cyclohexane constituted about as efficient an extracting medium for $UO_2^{2+}$ as the chelating agent in tetradecanol alone. These observations are probably due to the greater solubilities of the longer chain amidoxime-metal chelates in the hydrocarbon medium.

In the specification I refer to the extraction of a particular metal ion without mentioning its oppositely charged associated ion because the latter was found to be of no consequence. For example, $Cu^{2+}$ was chelated equally well by the amidoxime solutions cited in Table I from aqueous solutions of its nitrates, chloride, bromide, sulfate, or acetate; similarly for cobaltous nitrate, chloride, and sulfate. The extraction of uranyl ($UO_2^{2+}$) ion seemed to be enhanced somewhat by the presence of chlorides such as sodium, potassium, magnesium, and calcium. This observation may be due to the fact that chloride is incorporated in the $UO_2^{2+}$-amidoxime complex so as to render it more soluble in the organic medium than is the case with acetate or nitrate (the uranyl salts actually used).

The amidoximes are useful not only for the recovery of metal ions from industrial waste solutions such as electroplating baths, mine residue solutions, etc., but should be practical, particularly in cheap hydrocarbon solvents, for the extraction of expensive trace metals from the sea. In order to test this possibility on $UO_2^{2+}$ ion, a 2% sodium chloride solution containing 1 part per billion of $UO_2^{2+}$ (the approximate concentration in the sea) was extracted with the coco amidoxime mixture in 2-butyloctanol-1 and cyclohexane as the mixed solvent. The details were as follows: 500 ml. of extracting solution (10 gr. coco amidoximes dissolved in 150 ml. 2-butyloctanol-1 made to 500 ml. with cyclohexane) were placed in a specially designed separatory funnel so that the solution to be extracted was fed in continuously while stirring the mixture. The $10^{-9}$ $UO_2^{2+}$ solution was allowed to flow in at about the rate of 1 liter/10 minutes while stirring at about 300 r.p.m. By occasionally manipulating the inflow and outflow stopcocks a steady state was readily maintained. 100 liters of $UO_2^{2+}$ solution were passed through in 3 six hour periods on 3 successive days. Analysis of the $UO_2^{2+}$ content eluted with 20 ml. of 3 molar HCl was 80%±10% of the original aqueous $UO_2^{2+}$ content. This represents a 5000 fold increase in $UO_2^{2+}$ concentration together with a concomitant separation of unwanted sodium chloride.

Another use of these amidoxime solutions suggested by the data of Table I is in the separation of metal ions by a variation of pH. For example, $(AuCl_4)^{1-}$, $Fe^{3+}$, $UO_2^{2+}$, and $Mn^{2+}$ may be separated practically quantitatively in stages of decreasing acidity in the order given.

All the amidoximes used in this work were prepared in the following manner. The corresponding nitriles as pure compounds or commercial mixtures (prepared from the mixed fatty acids derived from biochemical sources) were treated with excess methanolic hydroxylamine (prepared by mixing solutions of methanolic potassium hydroxide and methanolic hydroxylammonium chloride, followed by filtration of the precipitated potassium chloride). These methanolic solutions or mixtures were usually refluxed for 4 to 6 hours followed by a period of 12 to 48 hour stand at room temperature. Much of the methanol was then removed in vacuo at or below room temperature. The amidoximes usually crystallized as white solids. In the cases of the single compounds, recrystallization was carried out from methanol. In the cases of the mixtures (coco, soy, tallow, etc.) the concentrated methanolic solutions were poured into cold water and filtered. This was done in order to avoid as much fractionation as possible of the longer from the shorter chain derivatives which would occur if crystallization from methanol were done. The filtered mixtures were washed thoroughly with cold water and dried in vacuo. Although no analysis of the resulting amidoxime mixture was made to determine how closely it corresponded with the original homologous distribution of fatty nitriles, the high yield of product (95% or better) indicated little change. The compositions of the mixed nitriles converted to the corresponding amidoximes were the following:

Coco nitriles:
    $C_8$ saturated 8%
    $C_{10}$ saturated 8%
    $C_{12}$ saturated 46%
    $C_{14}$ saturated 17%
    $C_{16}$ saturated 8%
    $C_{18}$ saturated 5%
    $C_{18}$ unsaturated 5%

Soy nitriles:
    $C_{16}$ saturated 18%
    $C_{18}$ saturated 13%
    $C_{18}$ unsaturated 66%

Tallow nitriles:
    $C_{16}$ saturated 29%
    $C_{18}$ saturated 24%
    $C_{18}$ unsaturated 44%

The nitriles in the above list are those corresponding to the common biochemical fatty acids of the given carbon content.

Having so described my invention, I do not limit myself to the specifically mentioned times, temperatures, quantities of chemicals, or steps in procedure, as these are given simply to clearly describe my invention as set forth in my specification and claims, and they may be varied without going beyond the scope of my invention.

I claim:

1. A process for the extraction of metallic ions from aqueous solution, said metallic ions being selected from the class of metallic ions consisting of the metallic ions of group VIII, the metallic ions of group IB, manganese and uranium, which comprises the extraction of said metallic ions from said aqueous solution as complexes of said metallic ions by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms and cyclohexylamidoxime in an organic, water immiscible solvent.

2. A process for the extraction of uranium ion from an aqueous solution which comprises extracting the uranium ion from said aqueous solution as a complex of uranium ion by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms, and cyclohexylamidoxime in an organic, water immiscible solvent.

3. A process for the extraction of iron ion from an aqueous solution which comprises extracting the iron ion from said aqueous solution as a complex of iron ion by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms, and cyclohexylamidoxime in an organic, water immiscible solvent.

4. A process for the extraction of gold ion from an aqueous solution which comprises extracting the gold ion from said aqueous solution as a complex of gold ion by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms, and cyclohexylamidoxime in an organic, water immiscible solvent.

5. A process for the extraction of platinum ion from an aqueous solution which comprises extracting the platinum ion from said aqueous solution as a complex of platinum ion by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms, and cyclohexylamidoxime in an organic, water immiscible solvent.

6. A process for the extraction of palladium ion from an aqueous solution which comprises extracting the palladium ion from said aqueous solution as a complex of palladium ion by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms, and cyclohexylamidoxime in an organic, water immiscible solvent.

7. A process for the extraction of ruthenium ion from an aqueous solution which comprises extracting the ruthenium ion from said aqueous solution as a complex of ruthenium ion by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms, and cyclohexylamidoxime in an organic, water immiscible solvent.

8. A process for the extraction of rhodium ion from an aqueous solution which comprises extracting the rhodium ion from said aqueous solution as a complex of rhodium ion by a solution of an amidoxime, said amidoxime being selected from the class consisting of aliphatic amidoximes containing four to twenty carbon atoms, phenyl aliphatic amidoximes with an aliphatic chain of one to six carbon atoms, cyclohexylalkylamidoximes with an alkyl chain of one to six carbon atoms, and cyclohexylamidoxime in an organic, water immiscible solvent.

9. A process for the extraction of metallic ions from aqueous solution, said metallic ions being selected from the class of metallic ions consisting of the metallic ions of group VIII, the metallic ions of group IB, manganese and uranium, which comprises the extraction of said metallic ions from aqueous solution as complexes of said metallic ions by a solution of stearamidoxime in an organic, water immiscible solvent.

10. A process for the extraction of metallic ions from aqueous solution, said metallic ions being selected from the class of metallic ions consisting of the metallic ions of group VIII, the metallic ions of group IB, manganese and uranium, which comprises the extraction of said metallic ions from aqueous solution as complexes of said metallic ions by a solution of caproamidoxime in an organic, water immiscible solvent.

11. A process for the extraction of metallic ions from aqueous solution, said metallic ions being selected from the class of metallic ions consisting of the metallic ions of group VIII, the metallic ions of group IB, manganese and uranium, which comprises the extraction of said metallic ions from aqueous solution as complexes of said metallic ions by a solution of a mixture of amidoximes derived from soy fatty acids in an organic, water immiscible solvent.

12. A process for the extraction of metallic ions from aqueous solution, said metallic ions being selected from the class of metallic ions consisting of the metallic ions of group VIII, the metallic ions of group IB, manganese and uranium, which comprises the extraction of said metallic ions from aqueous solution as complexes of said metallic ions by a solution of a mixture of amidoximes derived from coconut fatty acids in an organic, water immiscible solvent.

13. A process for the extraction of metallic ions from aqueous solution, said metallic ions being selected from the class of metallic ions consisting of the metallic ions of group VIII, the metallic ions of group IB, manganese and uranium, which comprises the extraction of said metallic ions from aqueous solution as complexes of said metallic ions by a solution of a mixture of amidoximes derived from tallow fatty acids in an organic, water immiscible solvent.

14. A process for the extraction of uranium ion from an aqueous solution which comprises extracting the uranium ion from said aqueous solution as a complex of uranium ion by a solution of caproamidoxime in an organic, water immiscible solvent.

15. A process for the extraction of uranium ion from an aqueous solution which comprises extracting the uranium ion from said aqueous solution as a complex of uranium ion by a solution of a mixture of amidoximes derived from coconut fatty acids in an organic, water immiscible solvent.

16. A process for the extraction of uranium ion from an aqueous solution which comprises extracting the uranium ion from said aqueous solution as a complex of uranium ion by a solution of caproamidoxime in a solvent consisting of 75% cyclohexane and 25% tetradecanol.

References Cited in the file of this patent

Rodden (Editor): "Analytical Chemistry of the Manhatten Project," pp. 25, 27, 33. Publ. by McGraw-Hill Book Co., New York (1950).

Kuras et al.: Chemical Abstracts, vol. 45, pp. 5572i–5573a (July 10, 1952); vol. 47, p. 13542f (November 25, 1954).